United States Patent [19]
Brooks

[11] Patent Number: 5,881,597
[45] Date of Patent: Mar. 16, 1999

[54] CONSUMPTION INDICATOR LABEL APPARATUS, AND METHODS OF USING SAME

[76] Inventor: Ruth Brooks, 9439 Oak St., Taylor, Mich. 48180

[21] Appl. No.: 915,249

[22] Filed: Aug. 20, 1997

Related U.S. Application Data

[60] Provisional application No. 60/024,644, Aug. 22, 1996.
[51] Int. Cl.$^6$ ........................................... G01F 19/00
[52] U.S. Cl. .................................................. 73/428
[58] Field of Search ............................. 73/428; 428/40.1, 428/40.5, 42.1, 42.2, 42.3, 43, 192, 354; 40/310, 5, 121, 324; 283/62; 116/306; 206/459.1

[56] References Cited

U.S. PATENT DOCUMENTS

| | | |
|---|---|---|
| 2,833,064 | 5/1958 | Parker . |
| 4,752,087 | 6/1988 | Weisbach . |
| 4,877,119 | 10/1989 | Hosking . |
| 5,139,836 | 8/1992 | Burke . |
| 5,227,209 | 7/1993 | Garland . |
| 5,264,265 | 11/1993 | Kaufmann . |
| 5,462,783 | 10/1995 | Esselmann . |
| 5,492,246 | 2/1996 | Bailey . |
| 5,580,311 | 12/1996 | Haste, III . |

*Primary Examiner*—Robert Raevis
*Attorney, Agent, or Firm*—Carrier, Blackman & Associates, P.C.; William D. Blackman; Joseph P. Carrier

[57] ABSTRACT

A device for recording consumption of a consumable substance during a time period. The device comprises a first member having a first surface for temporary securement to a drinking container; a second member having a surface which is removably engaged with the first surface of the first member; a plurality of tab members, each of which is removably secured along a second surface of the first member; and wherein each of the tab members includes a marking which is different from the other markings and which indicates an amount which has been consumed during the period.

14 Claims, 2 Drawing Sheets

CONSUMPTION INDICATOR LABEL APPARATUS, AND METHODS OF USING SAME

BACKGROUND OF THE INVENTION

1. Field of the Invention

This invention relates to a serving counter, and in particular to a serving counter which indicates an amount of a consumable substance, such as water which has been consumed throughout a 24 hour period.

The recommended minimum daily amount of water intake is eight ounces eight times per day, amounting to a total of 64 ounces of water per day. For people who are significantly large or small, such as obese people or small children, the recommended minimum varies depending upon the person's size and/or weight. In any event, a person often forgets the number of containers of water which he/she has consumed in a day, thereby leading to water consumption which fails to meet the recommended daily amount. As a result, the present invention addresses the problems associated with meeting the recommended minimum daily water amount by allowing for substantially easy recording of water consumed.

2. The Relevant Art

There are known drinking containers which include means for indicating an amount of fluid which has been consumed over a period of time. For instance, Kimpson U.S. Design Pat. No. 333,066, Bailey U.S. Design Pat. No. 350,457, and Claudias U.S. Design Pat. No. 314,689 disclose drinking containers having rotary controls for pointing to one of a plurality of numbers.

Yuen U.S. Pat. No. 4,621,670 discloses a food storage container which includes a flange having dates printed thereon and a lid having a pointer.

Garby U.S. Pat. No. 5,242,067 discloses an adaptor for use as a bottle closure device, having an indicator which displays the number of times the bottle has been opened.

Parker U.S. Pat. No. 2,833,064 discloses a recording device for medicine intake.

Wrobel U.S. Pat. No. 4,609,208 discloses a label identification device for electrical wires.

Kauflnann U.S. Pat. No. 5,264,265 discloses a multi-ply, resealable, peel-back label.

Essehnann U.S. Pat. No. 5,462,783 discloses a label dispensing sheet for setting labels on pages of books or other publications.

The above-identified references, however, fail to provide a device which indicates the number of servings and/or drinking containers of water which has been consumed in a 24 hour period, and which temporarily adheres to a conventional drinking container for easy recording and updating.

SUMMARY OF THE INVENTION

The present invention overcomes the above-discussed limitations and shortcomings of known serving indicators and satisfies a significant need for a disposable consumption indicator which is adapted for use with virtually any container.

According to a first preferred embodiment of the present invention, there is provided a water consumption indicator device comprising a first backing member including an adhesive surface and a smooth, waxy surface; a second backing member which is sized in order to temporarily adhere to the adhesive surface of the first backing member, and including a smooth, waxy surface which engages therewith; and a plurality of tab members which temporarily adhere to the smooth surface of the first backing member and are individually peelable therefrom. Each tab member includes markings indicating an amount of water which has been previously consumed throughout the day.

In use, the second backing member is removed from the first backing member, thus exposing the adhesive surface of the first backing member. Next, the first backing member is attached to a drinking container by pressing the first backing member against a surface thereof. Thereafter, as each serving of water is consumed throughout the course of the day using the drinking container, a tab member is peeled from the first backing member 1, the tab member having a number printed thereon which corresponds to a cumulative amount of water consumed throughout the 24 hour period. When all of the tab members have been removed from the first backing member, the user has met the recommended daily amount of water consumption. Thereafter, the first backing member may be removed from the drinking container by peeling it therefrom.

It is an object of the invention to provide a device which quickly, easily and accurately records the number of containers of water consumed during a period of time.

It is another object of the invention to provide such a device which is adapted for use with virtually any drinking container.

Another object of the invention is to provide such a device which is simple in construction and inexpensive to manufacture.

Other objects, advantages, and salient features of the present invention will become apparent from the following detailed description, which, when taken in conjunction with the annexed drawings, discloses the preferred embodiments of the present invention.

DETAILED DESCRIPTION OF THE PREFERRED EMBODIMENTS

Figure 1:
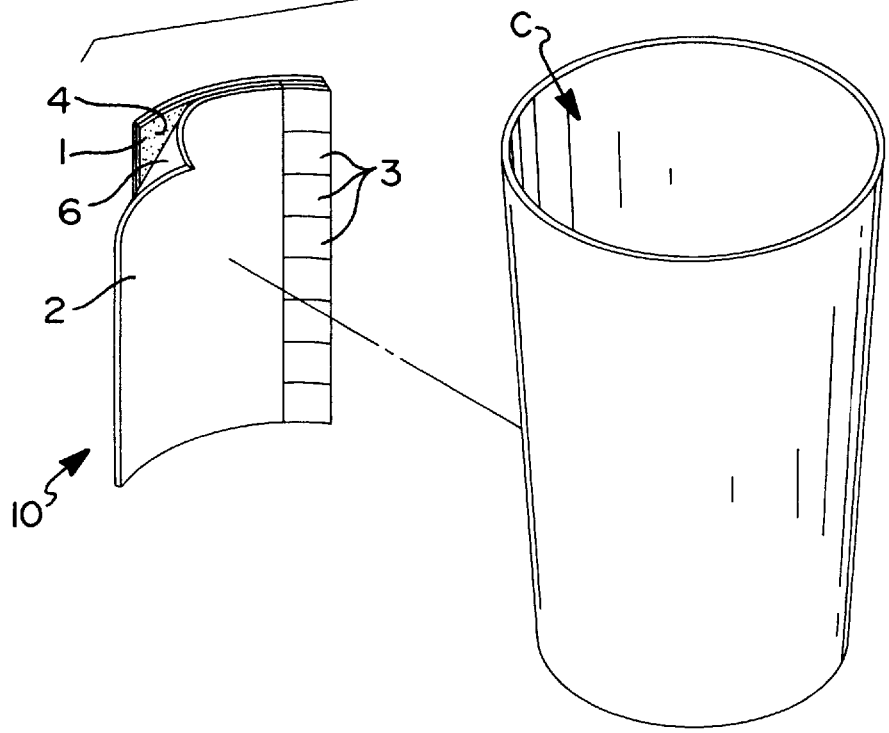
FIG. 1 is an exploded view of a preferred embodiment of the present invention.
Figure 2:
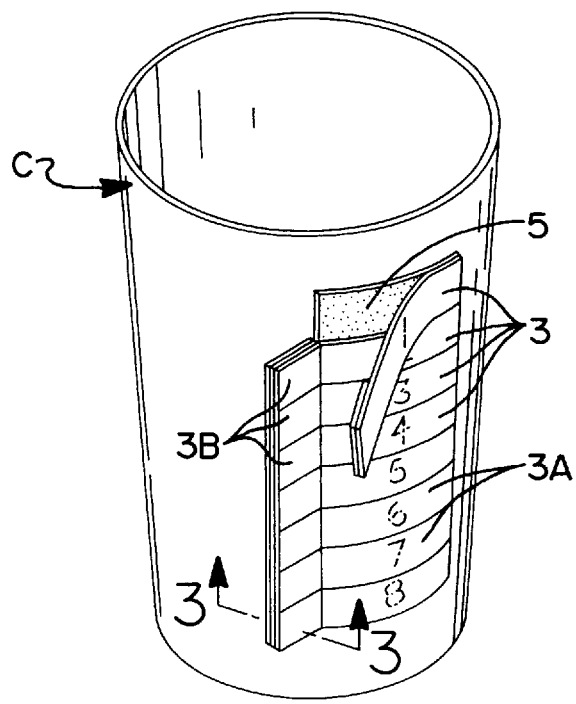
FIG. 2 is a perspective view of a preferred embodiment of the present invention.
Figure 3:
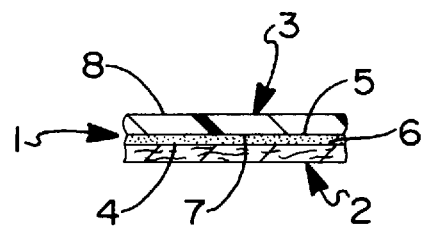
FIG. 3 is a cross-sectional view of the preferred embodiment of FIG. 2 taken along the 3—3 line thereof.

Referring to FIGS. 1–3, there is disclosed a consumption indicator 10 according to the present invention, comprising first backing member 1, second backing member 2, and a plurality of tab members 3. The present invention is preferably constructed from paper or a similar material in order to provide a device which is easy to use and inexpensive to manufacture.

First backing member 1 is preferably but not necessarily a substantially rectangular sheet of paper material. Backing member 1 preferably includes an adhesive surface 4 for temporary attachment to a drinking container; and a second surface 5 having a substantially smooth, wax-like coating or finish so that adhesive-backed articles may be removably secured thereto. As shown in FIG. 2, the adhesive surface 4 of first backing member 1 is adapted for attachment to a drinking container so that tab members 3 may be removably secured thereto. A minor portion of the adhesive surface 4 of first backing member 1, such as a corner portion thereof, is preferably but not necessarily nonadhesive so that first backing member 1 is easily removable from a drinking container by peeling it therefrom when it is no longer being used.

Second backing member 2 is preferably but not necessarily sized so that a major portion thereof covers the adhesive surface of first backing member 1. Second backing member 2 preferably includes a surface 6 which is substantially smooth with a wax-like finish and/or coating so that such surface is removably secured to the adhesive surface of first backing member 1 (FIGS. 1 and 3). Second backing member 2 is adapted for protectively covering, and for temporarily maintaining the adhesiveness of the adhesive surface of first backing member 1 until first backing member 1 is secured to a drinking container C. After second backing member 2 is removed from first backing member 1, second backing member 2 may be thrown away.

The present invention preferably but not necessarily includes a plurality of tab members 3, each of which is individually, removably secured to the nonadhesive surface 5 of first backing member 1. As shown in FIGS. 1 and 2, each tab member 3 is preferably but not necessarily substantially rectangular and sized so that tab members 3 may be arranged in a column along the nonadhesive surface 5 of first backing member 1. Tab members 3 are preferably laminated so that the exposed surface of tab members 3 is substantially unaffected by moisture. The back surface of each tab member 3 preferably includes an adhesive surface 7 so that each tab member 3 removably adheres to the nonadhesive surface 5 of first backing member 1 (FIGS. 1 and 3). In this way, tab members 3 are selectively removable from first backing member 1 by individually peeling them therefrom.

Figure 4:
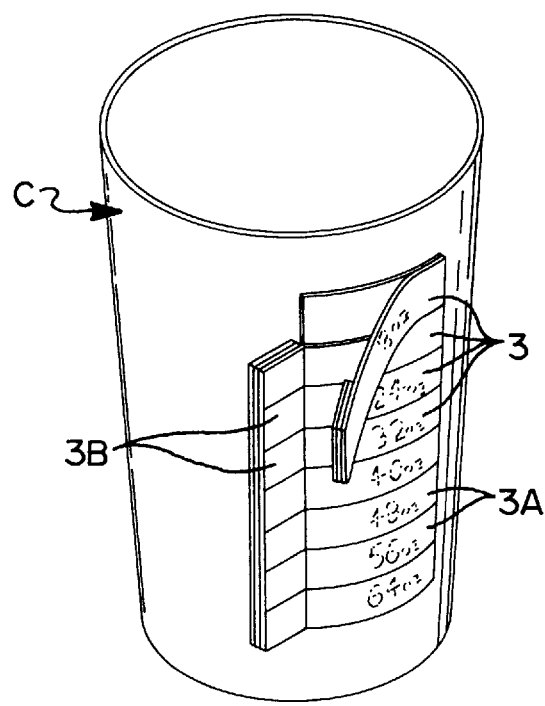
FIG. 4 is a perspective view of a second preferred embodiment of the present invention.

According to the preferred embodiments of the present invention, each tab member 3 preferably includes markings which indicate an amount of water consumption. In one preferred embodiment of the present invention, integers are printed on tab members 3 in sequential order, with each integer corresponding to the number of containers and/or servings of water which have been consumed throughout the 24 hour period, whether each container comprises an eight ounce container or a container being another size as may be prescribed by a health care provider (FIG. 2). In this way, different sized containers used with the present invention will quantify a different amount of water consumed each day. In a second preferred embodiment of the present invention, integers are printed on tab members 3 in multiples of eight, with one integer being printed on a tab member 3 and with each integer corresponding to the number of ounces of water which have been consumed throughout the 24 hour period (FIG. 4). It is noted that this embodiment is adapted for use with an eight ounce drinking container. Alternatively, other markings are printed on tab members 3 which record a cumulative amount of daily water consumption.

Tab members 3 are preferably constructed from a sheet of material, such as a sheet of paper. Referring to FIG. 2, each tab member 3 comprises a first portion 3A having an adhesive surface 7 for adhering to first backing member 1 and a second surface 8 on which an integer or other indicia is printed; and a second portion 3B which is flexibly attached to an end of first tab portion 3A. This flexible attachment, together with second tab portion 3B having non-adhesive surfaces, allows second tab portion 3B to pivot relative to first tab portion 3A so that second tab portion 3B may be easily gripped by a user's fingers. In a preferred embodiment of the present invention, the flexible attachment between first tab portion 3A and second tab portion 3B comprises a crease or seam in the sheet of material from which tab member 3 is constructed.

A method of recording the amount of water consumed throughout a 24 hour period comprises the steps of first obtaining a drinking container C which is sized to hold at least one standard sized serving of water, such as eight ounces of water, and obtaining a water consumption indicator 10 according to the present invention having second backing member 2 and tab members 3 secured to the adhesive and nonadhesive surfaces 4, 5 of first backing member 1, respectively. Tab members 3 are preferably but not necessarily arranged along first backing member 1 so that the numbers printed on tab members 3 appear in ascending order (FIG. 2). Next, second backing member 2 is removed from first backing member 1 by peeling second backing member 2 therefrom. With the adhesive surface 4 of first backing member 1 now exposed and with an outer surface of the drinking container C being substantially clean and dry, first backing member 1 is secured to the drinking container by pressing first backing member 1 firmly thereagainst (FIG. 1). Thereafter, as each container of water is consumed using the drinking container, a tab member 3 (having a marking corresponding to the sum total amount of water consumed during the 24 hour period) is peeled from first backing member 1. In this way, the user can quickly and easily keep track of the amount of water consumption during the 24 hour period by multiplying the number appearing on tab member 3 by the size of the drinking container. After all of tab members 3 have been removed from first backing member 1, the present invention indicates that the user has consumed his or her daily recommended amount of water. First backing member 1 may then be removed from the drinking container by peeling it therefrom. Thereafter, the above-described steps are repeated in each consecutive 24 hour period in order to ensure that the user continuingly meets his or her recommended amount of water intake.

It is noted that the present invention and the chosen drinking container are preferably disposable, so that tab members 3, first backing member 1, second backing member 2 and the drinking container may be discarded when no longer in use. Alternatively, the present invention may be constructed from stronger, more wear-resistant materials and compositions such that they may be reused each day for a prolonged period of time by temporarily adhering tab members 3 to second backing member 2 as they are removed from first backing member 1. As a result, at the end of each day tab members 3 and second backing member 2 may be re-secured to first backing member 1 in order to start over again for recording water consumption for the next day.

It is noted that the present invention may be used to indicate an amount of fluid other than water which has been consumed throughout a 24 hour period, in the event that water is unavailable for consumption or that another fluid is viewed by the medical community as a nutritional equivalent of water.

Although there have been described what are at present considered to be the preferred embodiments of the present invention, it will be understood that the invention can be embodied in other specific forms without departing from the spirit or essential characteristics thereof.

The described embodiments are, therefore, to be considered in all aspects as illustrative, and not restrictive. The scope of the invention is indicated by the appended claims rather than the foregoing description.

I claim:

1. A device for attaching to a container for use in recording consumption of a consumable substance, comprising:

a first member having a first surface for temporary securement to a container, and a second surface;

said first surface of said first member comprising an adhesive surface;

a second member for protectively covering said adhesive surface of said first member, said second member having a surface which is removably engaged with said first surface of said first member;

a plurality of peelably removable tab members, each of which is removably secured along said second surface of said first member; and wherein each of said tab members includes a marking which is different from markings on other of said tab members and which indicates a cumulative amount of a substance which is consumable over a period of time.

2. A device as recited in claim 1, wherein:

each of said tab members includes an engagement surface for temporary engagement with said second surface of said first member, and wherein a surface of said device, selected from the group consisting of said second surface and said engagement surface, comprises an adhesive surface.

3. A device as recited in claim 1, wherein:

said tab members are arranged in a column of tab members along said second surface of said first member when engaged therewith.

4. A device as recited in claim 1, wherein:

said marking on each of said tab members comprises an integer.

5. A device as recited in claim 1, wherein:

each said tab member comprises a first portion and a second portion;

said first portion of said tab member includes an adhesive surface for temporary securement to said second surface of said first member; and said second portion of said tab member extends from an end of said first tab portion and is substantially flexibly engaged therewith.

6. A device as recited in claim 5, wherein:

said tab member is constructed from at least one sheet of material; and said flexible engagement between said first tab portion and said second tab portion comprises a crease separating said first tab portion and said second tab portion.

7. A device as recited in claim 5, wherein:

said second tab portion is pivotally attached to said first tab portion.

8. A device as recited in claim 4, wherein:

said integer markings of said tab members increment successively.

9. A method of recording a substance consumed throughout a predetermined period of time, comprising the steps of:

obtaining a container;

obtaining a labelling device comprising a first backing member having an adhesive surface and a non-adhesive surface, a second backing member which is removably secured to said adhesive surface of said first backing member, and a plurality of tab members which are individually removably secured to said non-adhesive surface of said first backing member, each of said tab members including a marking which indicates an amount of said substance consumed during said predetermined period of time, said marking on each of said tab members being different from other of said markings;

applying said first backing member to said container, said first backing member having said tab members secured thereto;

consuming said substance from said container during said predetermined period of time;

removing a tab member from said first backing member by peeling said tab member off of said first backing member following said consumption step, said removed tab member having a marking corresponding to a cumulative total number of units of said substance consumed during said predetermined period of time; and repeating said consuming step and said tab removing step during said predetermined period of time, whereby said tab members are sequentially peelably removed from said first backing member as said substance is increasingly consumed.

10. A method as recited in claim 9, wherein:

said applying step comprises the steps of peeling said second backing member from said first backing member and pressing said first backing member against said drinking container.

11. A method as recited in claim 9, wherein:

each of said tab members comprises a first portion which is removably attached to said first backing member, and a second portion which extends from said first portion; and said tab member removing step comprises the steps of grasping said second tab portion and peeling said first tab portion from said first backing member.

12. A method as recited in claim 11, wherein:

each of said first tab portions includes an adhesive surface for securement to said non-adhesive surface of said first backing member; and said second tab portions comprise non-adhesive surfaces.

13. A method as recited in claim 9, wherein:

said markings of said tab members comprise integers which increment successively; and each said tab member includes a single marking appearing thereon.

14. A label apparatus comprising:

a first member which is selectively adherable along a surface of an object;

said first member including an adhesive surface and a substantially non-adhesive surface;

a second member which is removably attached to said first member;

a plurality of label members which are individually removably attached to said first member and arranged as a column of label members therealong;

each of said label members including a marking which is different from a marking on another of said label members;

wherein each of said label members comprises a first label portion having a surface which removably attaches to said first member and a second label portion which is flexibly attached to said first label portion; and wherein removal of one of said label members from said first member indicates a happening of an event identified by said marking on said removed label member;

wherein said first label portion of each label member includes an adhesive surface which removably adheres to said non-adhesive surface of said first member, and a non-adhesive surface on which said marking appears; and wherein said second label portion of each label member comprises a non-adhesive surface.

* * * * *